United States Patent [19]

Speet

[11] 4,230,900
[45] Oct. 28, 1980

[54] POWER POLE ASSEMBLY

[75] Inventor: Larry A. Speet, Holland, Mich.

[73] Assignee: Steelcase Inc., Grand Rapids, Mich.

[21] Appl. No.: 915,127

[22] Filed: Jun. 13, 1978

[51] Int. Cl.³ .............................................. E04B 1/38
[52] U.S. Cl. .................................. 174/48; 248/218.4; 248/343; 362/431
[58] Field of Search ................. 174/48, 49; 52/28, 29; 248/218.4, 219.1, 219.2, 219.3, 343, 323; 362/431

[56] References Cited

U.S. PATENT DOCUMENTS

| | | | |
|---|---|---|---|
| 2,905,806 | 9/1959 | Tunney | 248/323 X |
| 3,888,282 | 6/1975 | Liddall | 174/48 X |
| 4,015,397 | 4/1977 | Flachbarth et al. | 174/48 X |
| 4,041,657 | 8/1977 | Schuplin | 248/343 X |
| 4,114,327 | 9/1978 | Williams | 248/343 X |

Primary Examiner—Elliot A. Goldberg
Assistant Examiner—D. A. Tone
Attorney, Agent, or Firm—Price, Heneveld, Huizenga & Cooper

[57] ABSTRACT

The specification discloses a power pole assembly for bringing wiring through a hollow power pole from above and through a suspended grid supported ceiling is secured to a crossbar which in turn can be joined to spaced grid rails at any points along their length and at any angle with respect thereto by means of grid mounting clamps which can be releasably and movably joined to the rails and which are pivotally, movably and releasably secured to the crossbar. In this way, the power pole can be located at any position and at any angle relative to adjacent intersecting or parallel grid rails of the ceiling grid.

19 Claims, 7 Drawing Figures

POWER POLE ASSEMBLY

BACKGROUND OF THE INVENTION

The present invention relates to power poles which facilitate bringing wiring from above and through a suspended ceiling. This allows an architect to eliminate expensive floor ducts. Instead, he runs all wiring between the permanent ceiling and the suspended ceiling and then brings the wiring in through the suspended ceiling at appropriate points by running it through a hollow power pole. The power pole typically extends all the way to the floor or to the top of a room divider panel.

For stability, the power poles are anchored to the grid rails of the suspended ceiling by appropriate clamps. Prior artisans typically located the power pole in the corner of adjoining grid rails so that the power pole is connected to two grid rails. The power poles may additionally be anchored at the floor and at the natural ceiling, or at a room divider panel and the natural ceiling.

The need for clamping the power pole to grid rails limits the versatility of a ceiling wiring system in that it limits the point at which power poles can be located. This is particularly a problem where the architect wants to bring power to the top of room divider panels which are to be oriented at various angles with respect to the grid pattern of the ceiling grid, rather than parallel to any of the grid rails. In order to do so with current systems, the architect must also orient his power pole at an angle to the angle of the room divider panels since the power pole must be clamped to at least one grid rail.

SUMMARY OF THE INVENTION

The present invention overcomes and obviates this drawback by providing pole clamping means which are releasably, movably mounted on a crossbar and on the hollow power pole, the crossbar in turn being joined to spaced grid rails by two rail clamping means which are releasably, movably and pivotally joined to the crossbar and which include securing means for releasably, movably securing each to a grid rail. As a result, the power pole can be joined at different heights and at different points along the length of the crossbar, and the crossbar can be joined at different points along the length of spaced grid rails and at different angles with respect to the spaced grid rails. The power pole can thereby be located at virtually any point and at any angle between any given adjacent grid rails of the suspended ceiling.

These and other objects, advantages and features of the present invention will be more fully understood and appreciated by reference to the written specification and appended drawings.

DESCRIPTION OF THE PREFERRED EMBODIMENT

Figure 1:
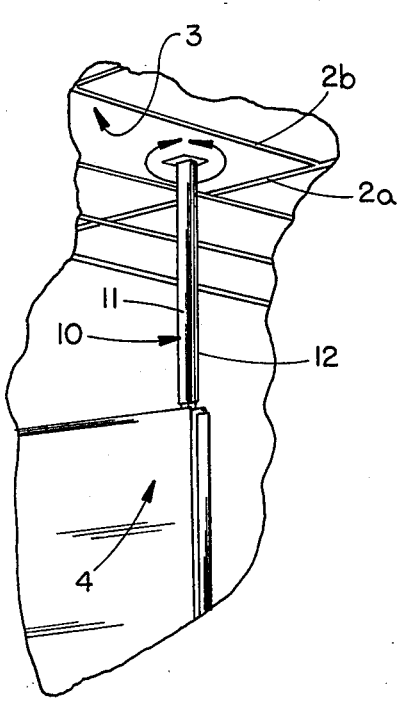
FIG. 1 is a perspective view showing a power pole coming through a suspended ceiling and being joined to the upper corner of a room divider panel.
Figure 3:
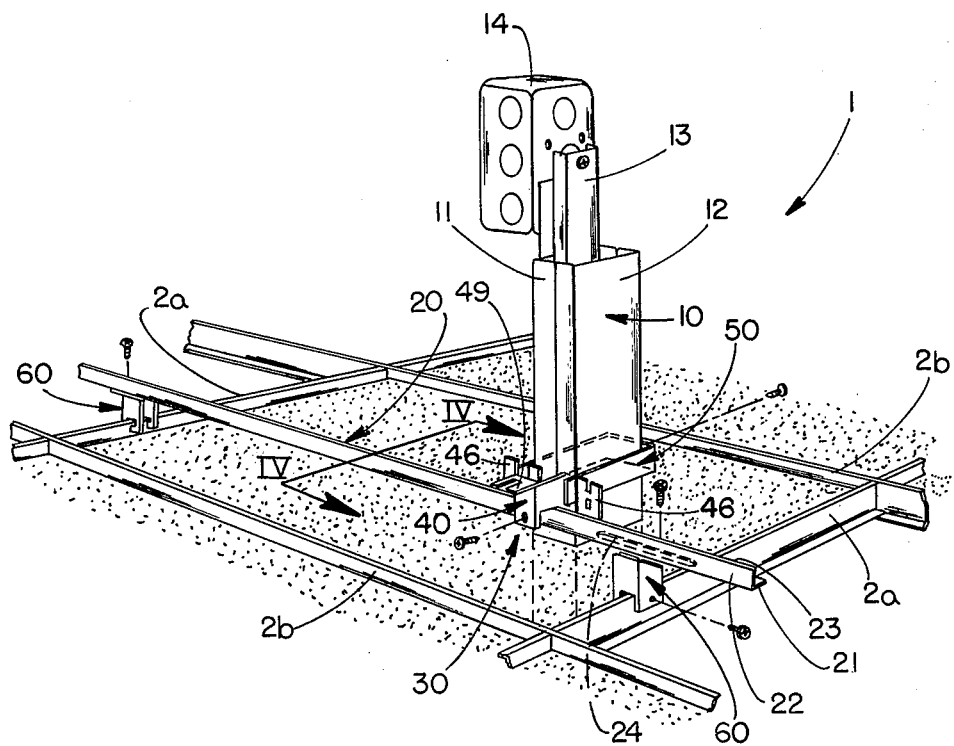
FIG. 3 is a view similar to FIG. 2, except that it shows the completed power pole assembly in which the power pole is clamped to the crossbar and the crossbar is in turn clamped to the ceiling grid rails.

In the preferred embodiment, power pole assembly 1 comprises a hollow power pole 10 clamped by a pole clamp assembly 30 to a crossbar 20 which in turn is secured to the spaced grid rails 2a of a suspended ceiling grid by means of rail clamp 60 (FIG. 3). Pole 10 extends down through a ceiling panel 3 and is mounted at the top corner on a room divider panel 4 (FIG. 1).

The suspended ceiling shown in the drawings is typical and comprises a ceiling grid comprised of a plurality of parallel grid rails 2a joined to a plurality of grid rails 2b which are parallel to one another and perpendicular to grid rail 2a (FIG. 3). Grid rails 2a and 2b are suspended from the natural ceiling and they in turn are shaped like inverted T's and support ceiling panels 3 on the projecting crossbar portions of the "T". Sometimes, these grid rails are referred to in the art as "T-bars".

Power pole 10 is comprised of two halves, 11 and 12, which can be separated so that wiring can be placed inside. Divider 13 divides the hollow interior of power pole 10 so that power wiring can be run through the power way defined by divider 13 and communication wiring can be run through the remainder of the interior of power pole 10. A power junction box 14 projects from the top of power pole 10 for bringing power wiring into power pole 10 at a point above the suspended ceiling.

Figure 4:
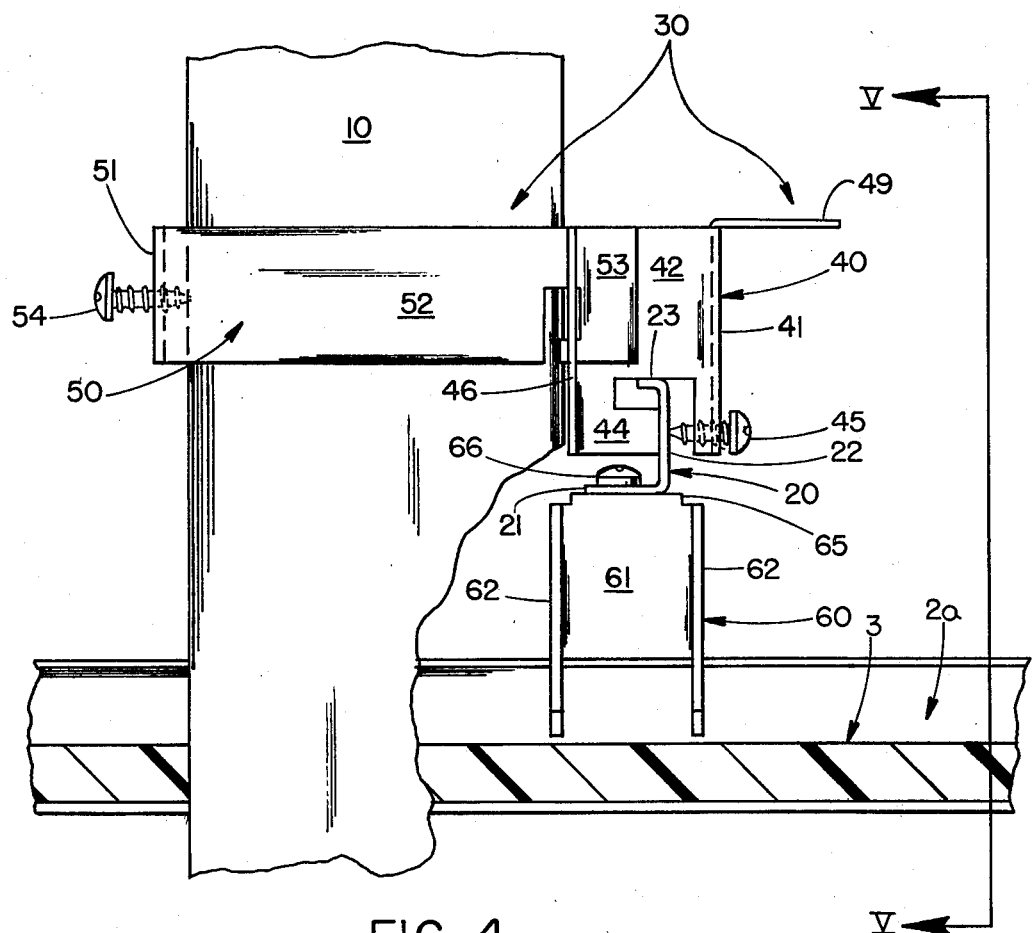
FIG. 4 is a cross-sectional view taken along plane IV—IV of FIG. 3, with the power pole broken away.
Figure 6:
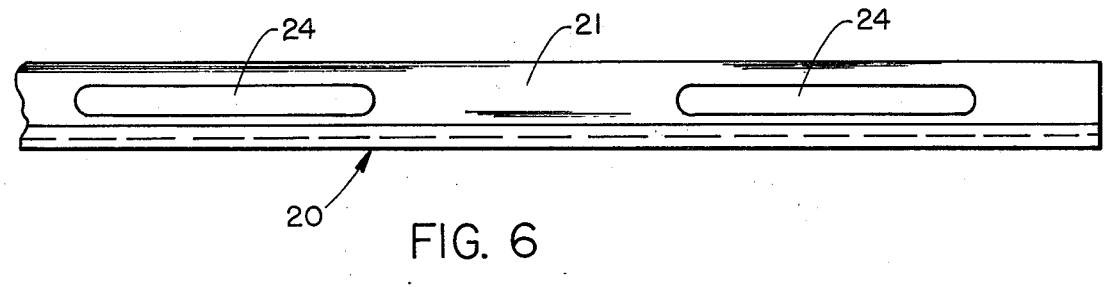
FIG. 6 is a top plan view of a fragmentary end portion of the crossbar.

Crossbar 20 is formed of steel and is generally C-shaped in cross section. It has a bottom wall 21, an upwardly projecting sidewall 22 and a top wall 23 which is shorter than bottom wall 21 (FIGS. 3 and 4). Bottom wall 21 includes a pair of elongated slots 24 therein towards each end of crossbar 20 (FIGS. 3 and 6). It is to one or the other of these slots 24 that a rail clamp 60 is joined.

Figure 5:
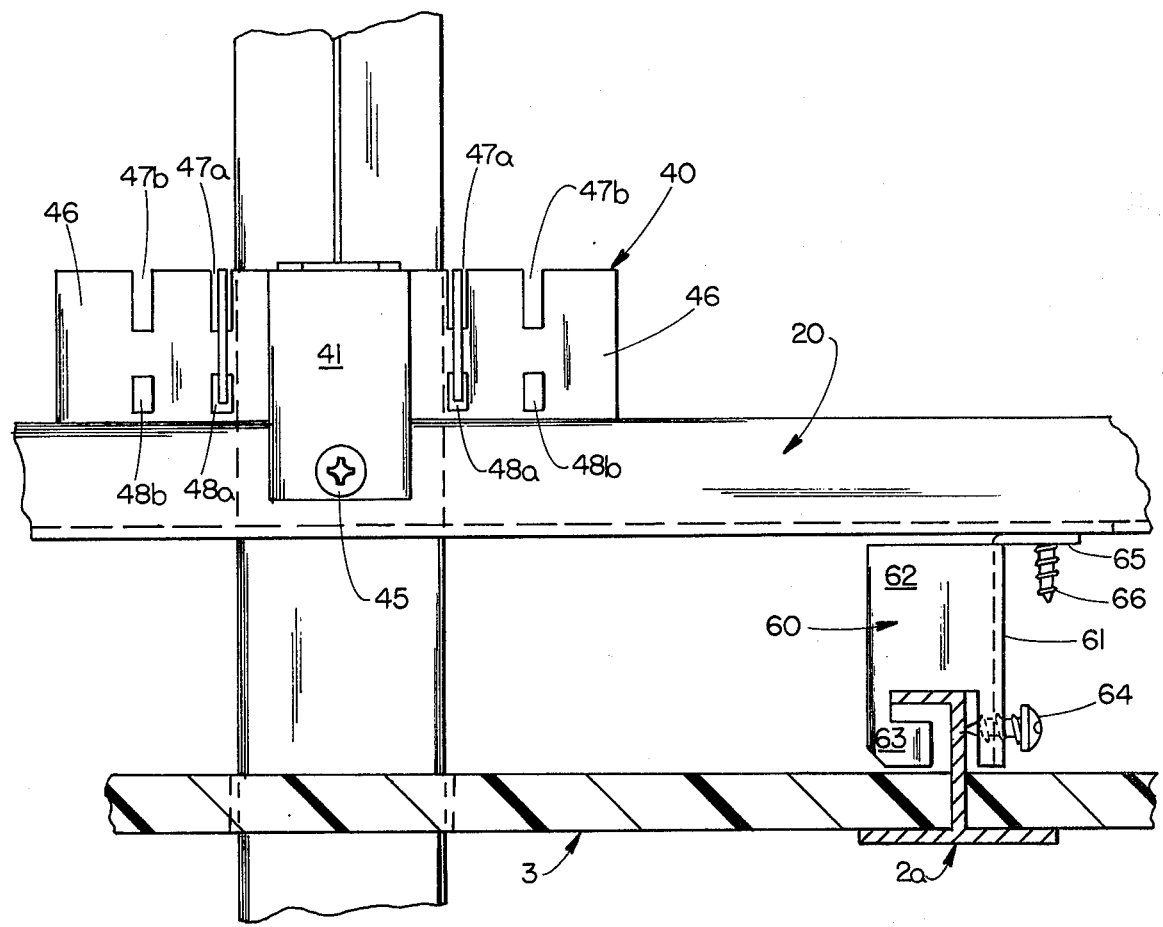
FIG. 5 is a cross-sectional view taken along plane V—V of FIG. 4.

Pole clamp assembly 30 comprises two brackets: a bar bracket 40 and a pole bracket 50 (FIGS. 3, 4, and 5). Bar bracket 50 is generally U-shaped in lateral, horizontal cross-section and has a base wall 41 and a pair of spaced side walls 42. Each side wall 42 is notched in an inverted L-shaped pattern to define a lower hook portion 44. Hook portion 44 hooks over the top of cross-bar 20 and includes clearance for top wall 23. Bar bracket 40 is then tightly clamped against crossbar 20 by means of a screw 45 which is threaded through the back wall 41 of bar bracket 40.

Projecting laterally from the end of each side wall 42 and away from one another are lateral flanges 46. Each lateral flange 46 includes an inside notch 47a and an outside notch 47b, both at the top edge thereof. Located below these notches are inside slot 48a and outside slot 48b. These notch and slot combinations are designed to receive hooked portions on pole bracket 50 as will be explained herein below.

Projecting from the top of bar bracket 40 and away from pole 10 is an optional mounting tab 49. This is grooved to receive any of a variety of fastners for fastening to a threaded rod or other bracket which is somehow joined to the permanent ceiling. This is an optional mounting approach which can be used in addition to or as an alternative to the crossbar mounting system for mounting two spaced grid rails 2a or 2b.

Pole bracket 50 is generally U-shaped and comprises a base wall 51 and spaced legs 52 which project forwardly therefrom. Each leg 52 terminates in a hooked end 53, which hooks over a notch, 47a and into a slot 48a in the lateral flanges 46 of bar bracket 40. Pole bracket 50 can then be locked in this position by tightening down a screw 54 which is threaded in the back wall 51 and which bears against power pole 10.

Because power pole 10 is rectangular in configuration, one might want to orient it with its long wall parallel to the flanges 46 of bar bracket 40, rather than with its short wall located parallel thereto. For this purpose, a similar but differently dimensioned pole bracket 50 is employed which has shorter legs 52 and a longer base wall 51. Its hooked ends 53 would then hook over notches 47a and into slots 48b. In this way, power pole 10 can clamp against bar bracket 40 either with its short wall parallel to flanges 46 and crossbar 20 or with its long wall parallel thereto.

Each rail clamp 60 is also generally C-shaped in lateral, horizontal cross-section and includes a base wall 61 joined to spaced side walls 62. Each side wall 62 is slotted with a generally inverted L-shaped slot or notch, so as to define a hooked end 63 (FIG. 5). This hooks over the grid rail 2a or 2b. Rail clamp 60 can be tightly clamped to the grid rail by means of a screw 64 which is threaded through an aperture in base wall 61.

Projecting rearwardly from base wall 61 is an upper mounting tab 65. A metal screw 66 is threaded into a hole therein. By passing metal screw 66 through a slot 24 in crossbar 20 and threading it into the aperture within mounting tab 65, one can positively secure rail clamp 62 crossbar 20 at any particular angle with respect to crossbar 20.

Figure 2:
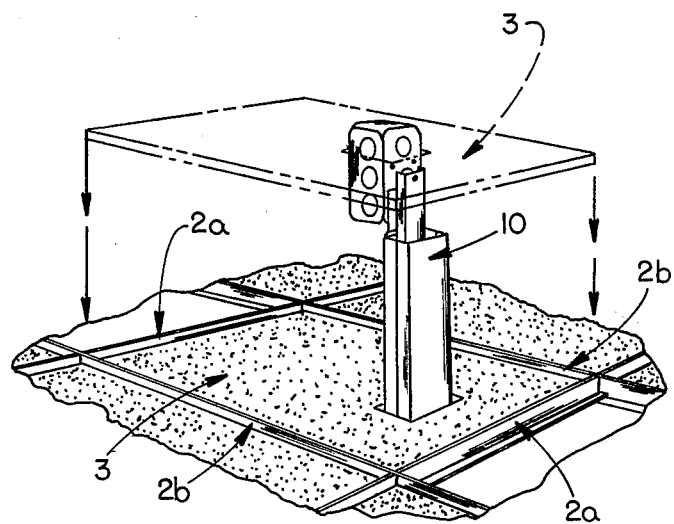
FIG. 2 is perspective view taken from above the suspended ceiling and showing the power pole extending through a ceiling panel.

In operation, one secures power pole 10 to a panel 4 after panel 4 has been oriented in any desired angle of orientation and located at any desirable point on the floor. This is done with the ceiling panel 3 removed in the area where power pole 10 will project through the suspended ceiling. The ceiling panel 3 is appropriately marked and a hole is cut therein so that the ceiling panel 3 can be slipped over power pole 10 and lowered down onto the receiving grid rails 2a and 2b as shown in FIG. 2. With rail clamps 60 loosely secured to cross bar 20, so that they will slide within a slot 24, and with bar bracket 40 loosely secured so that it can be slid along the length of crossbar 20, one then orients crossbar 20 so that it is located closely adjacent to power pole 10 and is parallel to one of the side walls thereof. One then orients crossbar 20 so that it is located closely adjacent to power pole 10 and is parallel to one of the side walls thereof. Each rail clamp 60 is hooked over its particular receiving rail 2a or 2b and then tightened in place by tightening screw 64 and screw 66.

Next, one slips pole bracket 50 over power pole 10 and hooks its hooked end 53 over the notches and into the receiving slots in bar bracket 40. Bar bracket 40 is secured in place by tightening screw 45 against crossbar 20 and pole bracket 50 is tightly secured in place by tightening screw 54 against pole 10.

Figure 7:
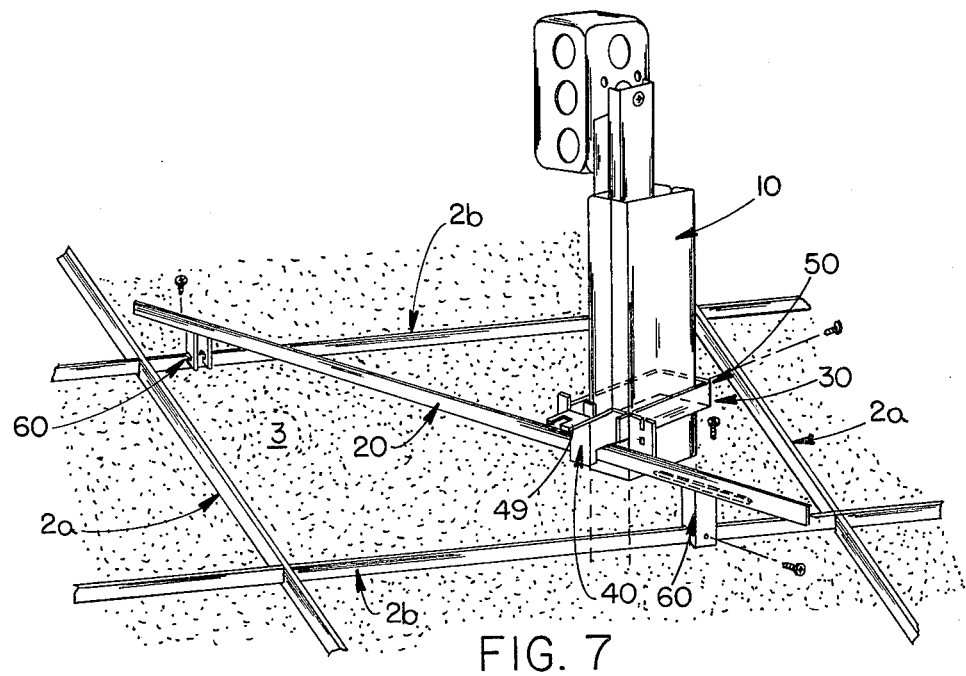
FIG. 7 is a perspective view similar to FIG. 3, but showing the power pole assembly oriented at a different angle relative to the adjacent spaced grid rails of the suspended ceiling.

FIG. 3 shows an arrangement in which cross bar 20 extends between adjacent grid rails 2a and parallel to grid rails 2b. However, an infinite variety of orientations and positions can be achieved and FIG. 7 shows crossbar 20 mounted to spaced grid rails 2b and at other than a 90° angle. Further, if it would be more convenient, one could position crossbar 20 so that it was joined at one end to a grid rail 2b and at the other end to a grid rail 2a.

Naturally it is understood that the above is merely a preferred embodiment of the invention and that various changes and alterations can be made without departing from the spirit and broader aspects of the invention as set forth in the appended claims.

The embodiments of the invention in which an exclusive property or privilege is claimed are defined as follows.

1. In a power pole assembly for bringing wiring through a hollow power pole from above and through a suspended grid supported ceiling, said grid including spaced suspended rails which in turn support ceiling panels, the improvement comprising: a crossbar; pole clamping means releasably, movably mounted on said crossbar and on said pole, whereby said pole can be secured at different heights to said crossbar and at different points along the length of said crossbar; two rail clamping means releasably, movably, and pivotally joined to said crossbar at spaced points along the length thereof, each including securing means for releasably, movably securing each to a grid rail at different points along its length, whereby said crossbar can be oriented at a plurality of different angles to said grid rails and said hollow pole can be located at a plurality of different points between adjacent grid rails and at a plurality of different angles with respect thereto; said rail clamping means comprising a bracket having a generally U-shaped lateral, horizontal cross-section defined by a back wall and a pair of spaced side walls, said side walls being notched to define hooks for hooking over a grid rail; a screw threaded through said back wall of said rail clamping means whereby said screw can be tightened against a grid rail; said rail clamping means including a tab projecting therefrom; said crossbar including at least two elongated slots extending along the length thereof, one located generally towards each end thereof; a screw passing through each said slot and being threaded into an aperture in said tab on said clamping means whereby said clamping means can be tightened on said crossbar at a plurality of pivotal angles with respect thereto and at any point along the length of said elongated slot.

2. The power pole assembly of claim 1 in which said pole clamping means comprises: a bar bracket releasably, movably mounted on said crossbar and a pole bracket movably embracing said power pole, said bar bracket and said pole bracket including means cooperating to secure the two together.

3. The power pole assembly of claim 2 in which said pole bracket includes a base wall and spaced legs which terminate in hooks; said bar bracket having spaced notches and spaced slots located below said notches; said hooks on said pole bracket hooking over said notches and into said slots to thereby attach said pole bracket to said bar bracket.

4. The power pole assembly of claim 3 in which a screw is threadably received in said base wall of said pole bracket whereby it can be tightened against said power pole to tightly secure said pole bracket to said bar bracket.

5. The power pole assembly of claim 3 in which these are two sets of a pair of said notches and slots in said bar bracket, one set having notches and slots spaced more closely together than the other set; said power pole being rectangular in cross section and having a short wall which is approximately the width of the distance between the closer set of said notches and slots and a long wall which is approximately as wide as the distance between said farther spaced set of said notches and slots whereby a different sized pole clamp can be used to clamp said power pole in position with either its short wall parallel to said crossbar or its long wall parallel to said crossbar.

6. The power pole assembly of claim 5 in which said bar bracket comprises a base wall, a pair of spaced side walls projecting therefrom and a pair of spaced flanges projecting laterally from the ends of said side walls and away from one another; said side walls being notched to define hooks, and said side wall hooks of said bar bracket hooking over and seating on said crossbar; said notches and said slots for receiving said hooked ends of said pole bracket being located on said laterally projecting flanges.

7. The power pole assembly of claim 6 which includes a screw being threadably received in an aperature in said base wall of said bar bracket whereby said screw can be tightened against said crossbar to securely clamp said bar bracket to said crossbar.

8. The power pole assembly of claim 7 in which said crossbar has a bottom wall to which said rail clamping means are secured and a side wall to which said bar bracket is secured.

9. The power pole assembly of claim 8 in which said bar bracket includes a tab projecting from the base wall thereof and including fastener receiving means whereby said bar bracket can be optionally secured by other means to other anchoring points.

10. The power pole assembly of claim 1 in which said pole clamping means comprises: a bar bracket releasably, movably mounted on said crossbar and a pole bracket movably embracing said power pole, said bar bracket and said pole bracket including means cooperating to secure the two together.

11. The power pole assembly of claim 10 in which said crossbar has a bottom wall to which said rail clamping means are secured and a side wall to which said bar bracket is secured.

12. In a power pole assembly for bringing wiring through a hollow power pole from above and through a suspended grid supported ceiling, said grid including spaced suspended rails which in turn support ceiling panels, the improvement comprising: a crossbar; pole clamping means releasably, movably mounted on said crossbar and on said pole, whereby said pole can be secured at different heights to said crossbar and at different points along the length of said crossbar; two rail clamping means releasably, movably and pivotally joined to said crossbar at spaced points along the length thereof, each including securing means for releasably, movably securing each to a grid rail at different points along its length, whereby said crossbar can be oriented at a plurality of different angles to said grid rails and said hollow pole can be located at a plurality of different points between adjacent grid rails and at a plurality of different angles with respect thereto; each said rail clamping means includes a tab projecting therefrom; said crossbar including at least two elongated slots extending along the length thereof, one located generally towards each end thereof; a screw passing through each said slot and being threaded into an aperture in said tab on one of said rail clamping means whereby each said rail clamping means can be tightened on said crossbar at a plurality of pivotal angles with respect thereto and at any point along the length of its respective one of said elongated slots.

13. In a power pole assembly for bringing wiring through a hollow power pole from above and through a suspended grid supported ceiling, said grid including spaced suspended rails which in turn support ceiling panels, the improvement comprising: a crossbar; pole clamping means releasably, movably mounted on said crossbar and on said pole, whereby said pole can be secured at different heights to said crossbar and at different points along the length of said crossbar; two rail clamping means releasably, movably and pivotally joined to said crossbar at spaced points along the length thereof, each including securing means for releasably, movably securing each to a grid rail at different points along its length, whereby said crossbar can be oriented at a plurality of different angles to said grid rails and said hollow pole can be located at a plurality of different points between adjacent grid rails and at a plurality of different angles with respect thereto; said pole clamping means comprising a bar bracket releasably, movably mounted on said crossbar and a pole bracket movably embracing said power pole, said bar bracket and said pole bracket including means cooperating to secure the two together; said pole bracket including a base wall and spaced legs which terminate in hooks; said bar bracket having spaced notches and spaced slots located below said notches; said hooks on said pole bracket hooking over said notches and into said slots to thereby attach said pole bracket to said bar bracket.

14. The power pole assembly of claim 13 in which there are two sets of a pair of said notches and slots in said bar bracket, one set having notches and slots spaced more closely together than the other set; said power pole being rectangular in cross section and having a short wall which is approximately the width of the distance between the closer set of said notches and slots and a long wall which is approximately as wide as the distance between said farther spaced set of said notches and slots whereby a different sized pole clamp can be used to clamp said power pole in position with either its short wall parallel to said crossbar or its long wall parallel to said crossbar.

15. The power pole assembly of claim 14 in which said bar bracket comprises a base wall, a pair of spaced side walls projecting therefrom and a pair of spaced flanges projecting laterally from the ends of said side walls and away from one another; said side walls being notched to define hooks, and said sidewall hooks of said bar bracket hooking over and seating on said crossbar; said notches and said slots for receiving said hooked ends of said pole bracket being located on said laterally projecting flanges.

16. The power pole assembly of claim 15 which includes a screw being threadably received in an aperture in said base wall of said bar bracket whereby said screw can be tightened against said crossbar to securely clamp said bar bracket to said crossbar.

17. In a power pole assembly for bringing wiring through a hollow power pole from above and through a suspended grid supported ceiling, said grid including spaced suspended rails which in turn support ceiling panels, the improvement comprising: a crossbar; pole clamping means releasably, movably mounted on said crossbar and on said pole, whereby said pole can be secured at different heights to said crossbar and at different points along the length of said crossbar; two rail clamping means releasably, movably and pivotally joined to said crossbar at spaced points along the length thereof, each including securing means for releasably, movably securing each to a grid rail at different points along its length, whereby said crossbar can be oriented at a plurality of different angles to said grid rails and said hollow pole can be located at a plurality of different points between adjacent grid rails and at a plurality of different angles with respect thereto; said crossbar has a bottom wall to which said rail clamping means are secured and a side wall to which said pole clamping means is secured; each said rail clamping means comprises a bracket having a generally U-shaped lateral, horizontal cross section defined by a back wall and a pair of spaced side walls, said side walls being notched to defined hooks for hooking over a grid rail; a screw being threaded through said back wall of said rail clamping means whereby said screw can be tightened against a grid rail; said pole clamping means including a bar bracket comprising a base wall, a pair of spaced side walls projecting therefrom, said side walls being notched to define hooks, and said sidewall hooks of said bar bracket hooking over and seating on said crossbar; a screw being theadably received in an aperture in said base wall whereby said screw can be tightened against said crossbar to securely clamp said bar bracket to said crossbar; said pole clamping means further comprising a pole bracket movably embracing said power pole, said bar bracket and said pole bracket including means cooperating to secure the two together.

18. The power pole assembly of claim 17 in which said pole bracket includes a base wall and spaced legs which terminate in hooks; said bar bracket having spaced notches and spaced slots located below said notches; said hooks on said pole bracket hooking over said notches and into said slots to thereby attach said pole bracket to said bar bracket.

19. The power pole assembly of claim 18 in which said pole bracket includes a base wall and spaced legs which terminate in hooks; said bar bracket having spaced notches and spaced slots located below said notches; said hooks on said pole bracket hooking over said notches and into said slots to thereby attach said pole bracket to said bar bracket.

* * * * *

UNITED STATES PATENT AND TRADEMARK OFFICE
CERTIFICATE OF CORRECTION

PATENT NO. : 4,230,900
DATED : October 28, 1980
INVENTOR(S) : Larry A. Speet

It is certified that error appears in the above—identified patent and that said Letters Patent is hereby corrected as shown below:

Column 3, line 22:

"47a" should be --47b--

Columne 5, line 1:

"these" should be --there--

Signed and Sealed this

Sixteenth Day of June 1981

[SEAL]

Attest:

Attesting Officer

RENE D. TEGTMEYER

Acting Commissioner of Patents and Trademarks